United States Patent
McCorkle et al.

(10) Patent No.: US 6,862,863 B2
(45) Date of Patent: *Mar. 8, 2005

(54) FLUSH PANEL SPACER AND METHOD AND APPARATUS OF INSTALLING THE SAME

(75) Inventors: Daniel J. McCorkle, Irvine, CA (US); Bobby L. Waits, Riverside, CA (US); Paul M. Secrets, Moreno Valley, CA (US); Faustino Riveron, Jr., Rancho Santa Margarita, CA (US)

(73) Assignee: Shur-Lok Corporation, Irvine, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 09/972,182

(22) Filed: Oct. 5, 2001

(65) Prior Publication Data

US 2002/0050105 A1 May 2, 2002

Related U.S. Application Data

(63) Continuation-in-part of application No. 09/243,743, filed on Feb. 3, 1999, now Pat. No. 6,298,633.

(51) Int. Cl.[7] .............................................. E04C 2/54
(52) U.S. Cl. ................ 52/787.1; 52/736.13; 52/787.11; 52/787.12
(58) Field of Search .......................... 52/787.1, 736.13, 52/787.11, 787.12; 411/176–181, 500–503, 183, 352–353

(56) References Cited

U.S. PATENT DOCUMENTS

| | | | |
|---|---|---|---|
| 3,137,887 A | * 6/1964 | Mannino .................... 16/2.1 |
| 3,252,493 A | * 5/1966 | Smith ........................ 411/108 |
| 3,443,473 A | * 5/1969 | Tritt ............................ 411/38 |
| 3,526,072 A | * 9/1970 | Campbell ................. 52/787.1 |
| 4,557,100 A | * 12/1985 | Gorges .................... 52/787.12 |
| 4,577,402 A | * 3/1986 | Swanstrom ................. 29/840 |
| 4,812,193 A | * 3/1989 | Gauron ...................... 156/293 |
| 4,817,264 A | * 4/1989 | Worthing .................... 29/512 |
| 5,093,957 A | * 3/1992 | Do ............................. 16/2.1 |
| 5,149,235 A | * 9/1992 | Ollis .......................... 411/41 |
| 5,207,462 A | * 5/1993 | Bartholomew ............. 285/321 |
| 5,437,750 A | * 8/1995 | Rinse et al. ............... 156/73.1 |
| 6,055,790 A | * 5/2000 | Lunde et al. ............. 52/787.1 |
| 6,095,738 A | * 8/2000 | Selle ......................... 411/427 |
| 6,298,633 B1 | * 10/2001 | McCorkle et al. ......... 52/787.1 |
| 6,488,460 B1 | * 12/2002 | Smith et al. ............... 411/353 |

* cited by examiner

Primary Examiner—Carl D. Friedman
Assistant Examiner—Chi Q Nguyen

(57) ABSTRACT

A method of installing an insert in a sandwich panel for mounting a fastener includes making a hole in the panel and inserting a spacer having a height greater than the thickness of the panel. An entrance rim of the spacer extends above an upper surface of the panel and a setting tool exerts a force on the entrance rim to force it into the hole and to position an upper edge of the entrance rim flush with the panel surface. The spacer can include an annular groove on an interior wall of the entrance rim to facilitate the cold working deformation during an installation in the panel and a hole engaging surface to align and maintain the spacer within the hole. An outer exterior surface of the entrance rim can be indented and coated with a first sealing compound to ensure a watertight seal with the panel. A second sealant material can be provided within the entrance rim for sealing with a head of any fastener extending through the spacer. An improved floor panel with spacer is accordingly provided for aircraft.

29 Claims, 6 Drawing Sheets

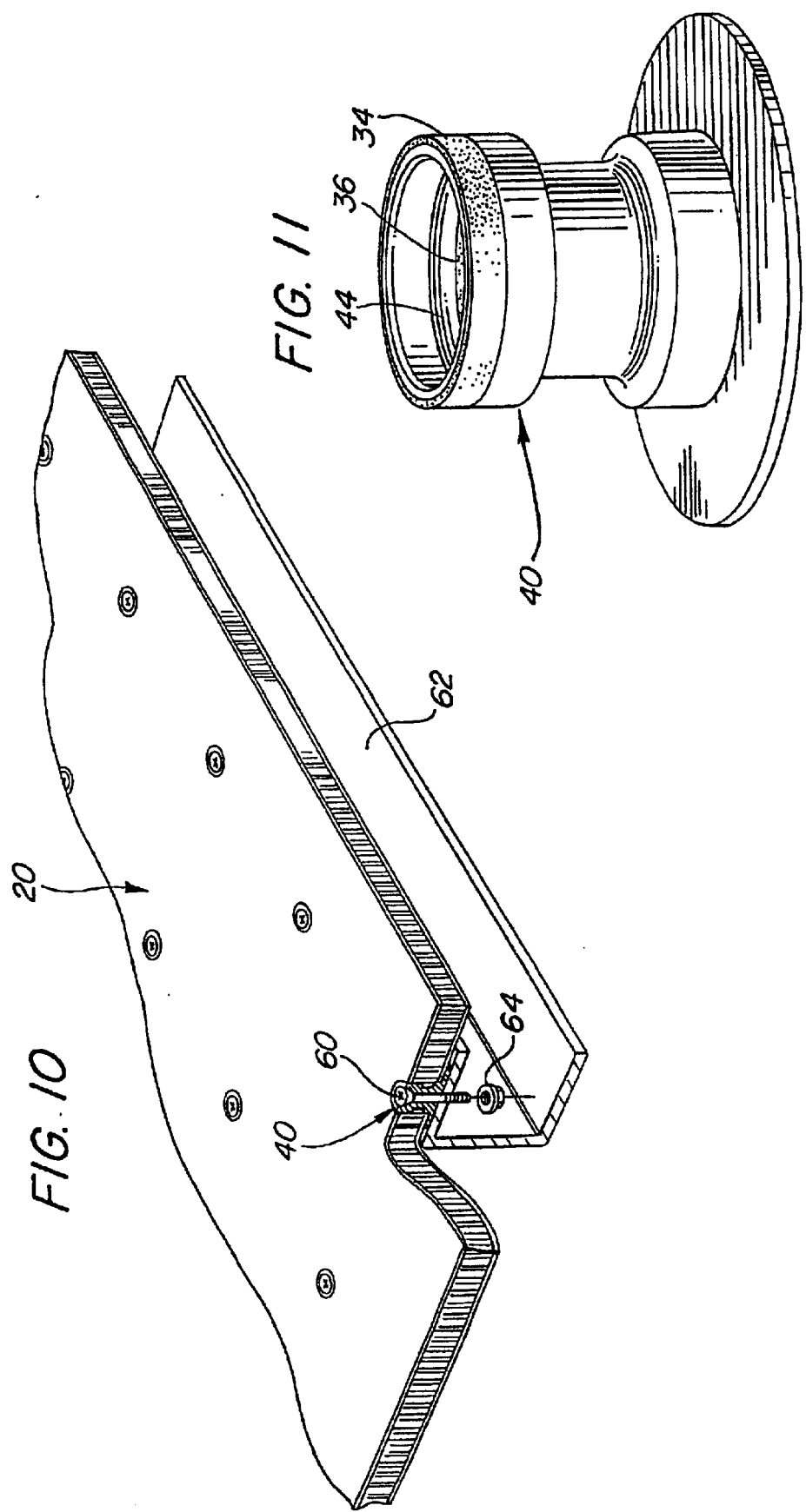

FLUSH PANEL SPACER AND METHOD AND APPARATUS OF INSTALLING THE SAME

RELATED APPLICATIONS

This application is a continuation in part application of U.S. patent Ser. No. 09/243,743, U.S. Pat. No. 6,298,633 filed on Feb. 3, 1999.

BACKGROUND OF THE INVENTION

1. Field of the Invention

The present invention is directed to spacers for mounting fasteners in sandwich panels, a method of installing the spacers so that the spacers are flush with an upper surface of the panels and can provide a liquid tight seal and a resultant improved panel assembly, such as a floor of an aircraft.

2. Description of Related Art

In the aerospace field a premium is placed upon lightweight but strong structural components. For example, a floor of an aircraft must be lightweight and strong and also must accommodate the stresses imposed upon the bulkhead by the flexing of the wings during flight. The aircraft industry uses sandwich panels that are fastened to spars and bulkheads by a large number of fasteners that are secured to the panels by extending through corresponding spacers mounted in the panels. Frequently, the sandwich panels are formed of thin aluminum face plates with expandable aluminum foil strips to form a core or laminated plastic resin upper and lower surface face sheets that sandwich a honeycomb interior structure of resin and paper. Both configurations provide excellent strength to weight or stiffness to weight relationships in comparison to solid metallic panels. Alternative face sheets or skins for sandwich panels can include steel, titanium, magnesium, aluminum alloys, and alloy steels, while cores can also be formed of plastic foam, balsa wood, high temperature alloys, plastic syntactic and steel foil. Generally, the core is honeycomb and has hexagonal cells with walls perpendicular to the face sheets.

Composite panels are frequently used in aircraft with high-strength, high-modulus, fiber-reinforced, thermostat or thermoplastic resins. However, such fiber-reinforced composite panels do not necessarily respond well to localized concentrated loading forces. As can be appreciated, when a composite structure is used as a floor panel or wall panel in an aircraft, it is frequently necessary to fasten objects to the panels. Thus, a number of different fasteners and spacers have been developed to accommodate resin sandwich panels and to prevent a localized concentration of loading.

Some of the problems that have been recognized in the installation of a spacer are the necessary chemical compatibility of any fastener or spacer used in sandwich panels so that there is not any galvanic corrosion. This issue frequently arises when the sandwich panels contain carbon fiber, and if the fibers come in contact with a less noble metallic fastener, there can be corrosion, thus, magnesium, aluminum, aluminum alloys, and alloy steels are frequently not compatible with a graphite based structure.

Another problem that has occurred with mounting fasteners and spacers in a sandwich panel is that the panel does not have a significant transverse reinforcement. Thus, when a hole is drilled for mounting a spacer, the edge of the hole can be crushed, since there is relatively little resistance to a crushing force.

As can be appreciated, the application of a fastener or spacer to a sandwich panel can damage the panel in drilling holes in the panels in that surface ply splintering, surface ply delaminating, heat damage, and irregularities inside the hole can occur.

When composite panels are drilled or machined, the natural sealing process of lamination is disrupted. In areas where the fibers become exposed, an action can take place in which water, fuel, spilt liquids, etc. can be slowly absorbed through the fiber matrix interface into the structure. If the sandwich panels have an aluminum face sheet, the liquid can leak into the interior core of the panel. These leakage problems can result in weight gain, laminate degradation, and even unpleasant odors.

It is highly desirable that at most only a minimum portion of a fastener or spacer extend above the upper surface of a sandwich panel. One of the approaches in the prior art to address this issue has been to provide a rim in a spacer member that is mechanically locked by flaring the rim over the edge of the hole. Some installation of spacers in an aircraft floor sandwich panel have intentionally dimpled a metallic face skin where each spacer is to be inserted in order to insure a flush mounting. Another approach has been to provide a sleeve and plug composite spacer with a pair of flanges that overlap both sides of the hole. Any protrusions above the upper surface can be abraded and can further cause carpet wear. Adhesives can be applied to flanges to directly adhere a spacer member to the surface of a sandwich panel. In an attempt to seal an aperture in the spacer, ring seal washers have sometimes been used on fasteners in an attempt to sealingly compress them in the aperture. Additionally, a potting material of an appropriate epoxy can be used for further securing these types of spacers and fasteners.

The aerospace industry generally desires to automate the installation of spacers and fasteners to eliminate the high labor cost, wherever possible, particularly when hundreds and thousands of fasteners and spacers can be used in a commercial aircraft.

Thus, the prior art is still attempting to optimize the design of spacers and fasteners used in sandwich panels in aircraft and the problems of sealing with a flush installation of spacers with a surface of a panel has yet to be optimized.

OBJECTS AND SUMMARY OF THE INVENTION

The present invention provides an improved spacer and/or fastener that can be mounted within a panel, such as a composite or sandwich structure panel of a predetermined thickness with a drilled hole to provide a flush mounting of an upper edge of an upper rim member of the spacer with an upper face surface of the panel. A spacer can include a body member having a central aperture with a larger lower flange member that extends radially outward from the body member. The flange member will bear against the lower face surface of the sandwich structure panel. An adhesive can be applied between the lower flange member and the lower face surface of the panel to assist in securing the spacer to the panel. The upper rim member extends upward from the body member and is concentric with the central aperture. The rim member has a larger inner diameter, than the diameter of the central aperture, with an inner flange extending from the rim member to the central aperture. The spacer will be sized for a particular panel thickness, such that the upper edge of the upper rim member will initially be extended above the upper panel surface when the lower flange member is in contact with the lower panel surface by a predetermined distance.

A sealing compound or sealant, such as, but not limited to, a thermoplastic resin or a silicon resin, can be positioned annularly over the inner flange so that any fastener mounted within the central aperture can contact and deform the sealing compound to encourage a seal between the spacer and the fastener. Another outer ring or coating of sealing compound can be positioned around the outer surface of the rim member to facilitate the sealing with the edge of the hole in the sandwich structure panel.

The resultant combination of the spacer sealed with the panel provides an improved panel assembly of particular advantage in wet area applications, such as a floor panel in a galley of an aircraft.

An alternative embodiment of the spacer can provide an upper rim member with an indented or annular recess relative to the outer diameter of the body member. A ledge or undercut is provided below a coating of sealant to thereby facilitate the carrying of the sealant through the sandwich structure panel so that it is positioned adjacent the upper edge of the hole or bore in the sandwich panel. Thus, when the rim member is contacted by a setting tool designed to provide a specific application of force for seating within and flush to the upper surface of the panel, the sealing compound will be distributed at the interface between the panel edge and the rim member to automatically effectuate a seal. Such a seal can not only render the joint liquid tight but can also address the galvanic corrosion problem. The inner diameter of the rim member can be undercut with an annular groove to bias the rim member to be deformed into the drilled hole.

Another embodiment of a spacer of the present invention can include a groove positioned about an outer diameter of the body member with the groove and surrounding surface of the body member coated annularly with the sealing compound. The groove helps to carry the sealing compound into the hole in the sandwich panel.

Finally, the flange can be provided with potting holes, if additional strength and support are necessary by applying an epoxy resin into the core of the sandwich panel.

Still another embodiment of a spacer of the present invention can include a unitary metallic spacer having an upper cylindrical outer surface that can support a coat of sealant material and a lower serrated cylindrical surface adjacent a flange that can be adhered to a panel surface. Between the upper cylindrical outer surface and the lower serrated cylindrical surface, the body of the spacer has an outer concave annular groove. The upper cylindrical outer surface has a hollow interior with an inner annular groove to facilitate a deformation of the upper entrance rim to a flush position with the panel surface during mounting.

The spacers can be installed in a sandwich structure panel by a method of initially boring a hole in the panel of a dimension slightly larger than the outer diameter of the spacer, for example with a diamond edge cutting tool. The spacer is then inserted into the hole and has a length that is greater than the thickness of the panel. The lower flange of the spacer can be coated with an adhesive to permit a direct bonding between the lower flange and the lower surface of the panel. Therefore, the entrance rim of the spacer will extend above an upper surface of the panel by a predetermined distance. A setting tool member having an appropriately configured contact surface can be inserted into the spacer so that the curved contact surface of the setting tool will compress the entrance rim downward and outward to provide a slight outward convex bulge that will assist in locking the spacer into the panel, while permitting the upper surface of the entrance rim to become flush with the upper surface of the panel as it is sealed.

Alternatively, a spacer with a lower serrated surface of a slightly greater diameter than the remainder of the upper body can provide a low friction engagement with the hole to help maintain the alignment of the spacer during the subsequent mounting with a setting tool.

An alternate setting tool can have an indented flat annular groove with a supporting annular cylindrical post to receive the entrance rim and apply a downward force to create an outward convex bulge beneath the panel surface as pre-designed by the configuration of the inner annular groove.

The setting tool for applying the force to the upper rim of the spacer can be bifurcated into two separate components to permit a replacement setting head to be inserted on a hand tool applicator with the replacement setting head providing the direct contact force to the rim.

The sealing compound is thus applied automatically to the hole in the sandwich panel with the spacer being the carrier of the sealing compound. This facilitates an automatic installation of spacers in the aerospace industry.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 10 is a partial cross-sectional view of a floor panel and spacer combination fastened to a bulkhead of an aircraft;

FIG. 11 is a prospective view of the spacer of FIG. 8;

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the aerospace art, since the general principles of the present invention have been defined herein specifically to provide an improved panel spacer and method and apparatus of installing the same, for example in a floor panel of an aircraft.

Figure 1:
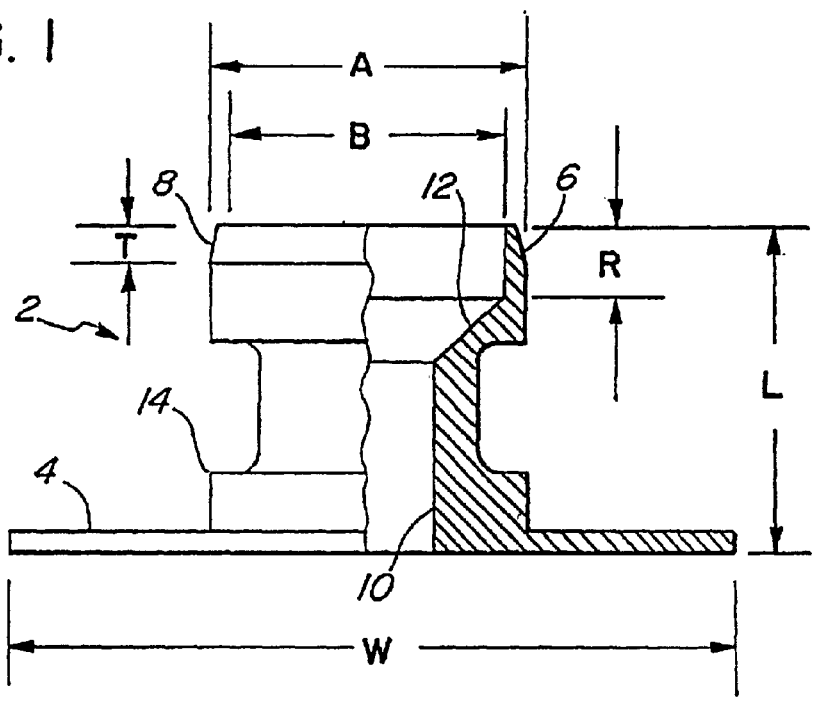
FIG. 1 is a partial cross-sectional view of a first embodiment of the present invention.

A spacer of the present invention is disclosed in FIG. 1. The spacers of the present invention can be broadly described as inclusive of panel inserts that are to be mounted in a sandwich panel structure where an upper edge of a rim is deformed to provide an edge which is flush with the perimeter of the hole. The spacer can have a smooth central bore whereby a fastener will extend through the bore for mounting with a nut or clip nut. Alternatively, the spacer can have a threaded bore to permit a direct fastening with a screw or can capture a floating nut for connection with a bolt. As can be appreciated, various forms of spacers and inserts can generically enjoy the advantages of the present invention and accordingly the present invention should not be limited to the preferred embodiments set forth herein.

As can be appreciated, the height of the spacer can vary depending upon the particular thickness of a sandwich panel structure. Thus, the body of spacer 2 of the present invention has a height L so that when its lower flange 4 is adhered to the lower surface of a sandwich panel structure, the upper rim 6 will have a height R that has been designed in combination with its thickness to be cold-worked or deformed by an applicator setting tool of a particular configuration to permit the upper portion of the entrance rim to be driven into the sandwich panel structure to lie flush with the upper panel surface and to bulge slightly outward beneath the face plate of the panel to assist in locking the spacer into the panel structure. The entrance rim 6 can further have a beveled upper outer edge 8 of a thickness T. Various modifications of the rim configuration can be provided to encourage both a locking deformation and to facilitate a seal with the panel structure, and accordingly, the embodiments disclosed herein should not be considered as limiting the scope of the present invention.

A central aperture 10 has a diameter substantially less than both the inner diameter B and the outer diameter A of the rim 6. A conical tapered entrance 12 to the central aperture 10 extends from the lower interior of the rim 6.

The spacer 2 can be formed of a material that is compatible with its corresponding panel and which has the capacity to permit deformation of the rim 6 to lie flush with the surface of a panel structure and to assist in locking the rim to the panel structure. For example, an aluminum alloy 6061 T-6 could be machined to create the spacer 2. Other material can be titanium, stainless steel or other metals that can be formed, for example by cold working.

As an example of dimensions for a sandwich panel of 0.400 inches in thickness, the diameter W of the lower flange can be 0.875 inches, the outer diameter A of the body 14 can be 0.435 inches, the height of the spacer L can be 0.455 inches, while the thickness of the flange 4 can be 0.020 inches. The height of the rim R can be approximately 0.070 inches, while the height of the beveled upper edge 8 could be approximately 0.035 inches.

Figure 2:
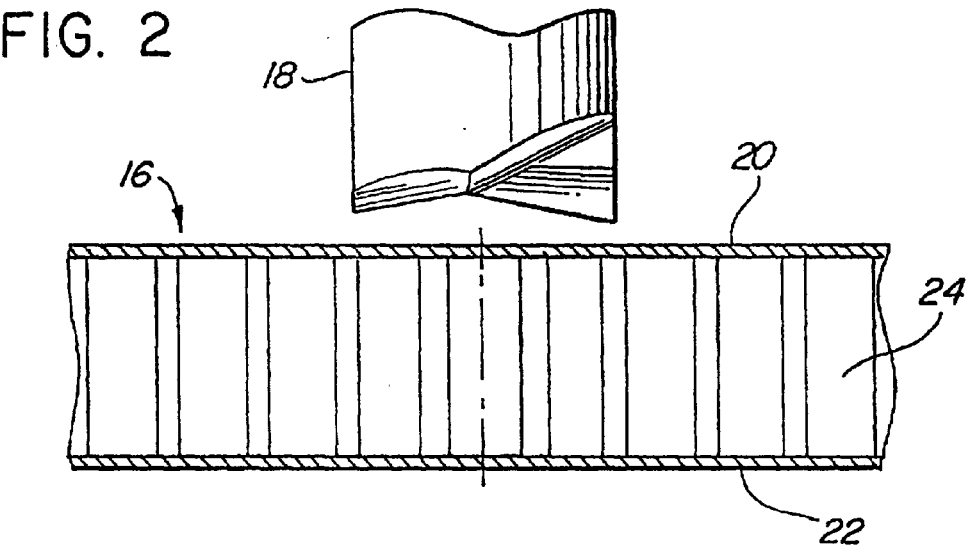
FIG. 2 is a schematic illustration of preparing a sandwich panel for the spacer of the present invention.

FIG. 2 discloses an illustration of a typical panel sandwich structure 16 wherein a drill 18, such as a diamond bit drill, can provide a hole or bore in a panel to be used as a floor in an aircraft. Generally, the bottom surface of the panel is supported during the drilling procedure, for example, by a block of wood. A numerically controlled drilling machine can automatically provide the desired number of holes in a panel. A numerically controlled drilling machine can automatically provide the desired number of holes in a panel. The panel 16 has an upper planar face sheet of aluminum or laminated resin plate 20 and a lower planar face sheet of aluminum or laminated resin plate 22. These face sheets can sandwich a honeycomb core structure 24 of cells that can be formed, for example, of a resin impregnated paper or thin strips of expanded aluminum foil. The honeycomb core 24 forms a low density structure and comprises hexagonical cells with walls perpendicular to the face sheets. A wide variety of materials can be used in the construction of the sandwich core, including high temperature alloys of paper, wood, foam, and plastic syntactic, along with steel. Typical application of sandwich panel structures in the aircraft industry are floor and ceiling panels, interior panels, baggage overhead racks, and galleys. Also the panels are sometimes used for instrumentation enclosure, shelves, and bulkhead panels.

While the present invention is particularly adapted for installation in composite and sandwich panels where a core structure has a different density than a face sheet and the spacer can both seal and be deformed to extend beneath the face sheet, it is also contemplated that a solid panel could receive the spacer of the present invention with an interference fit.

The nature of the sandwich panel structure material is such that it can only carry a limited concentrated loading due to its breakable face skins. Selecting a method for transmitting loads into and out of the panel is important in a successful utilization of a sandwich structure, therefore a large number of spacers are frequently used to distribute the total load when fasteners are attached, for example to a bulkhead in an aircraft. Generally, floor panels can be subject to shear, tension, and torque as the typical loads that can be applied.

It also should be appreciated that the present spacers can come in different configurations, and the configuration in FIG. 1 is provided with a through clearance, but could just as easily be with a through-threaded bore or can include, for example, a floating nut element. Additionally, the spacer can be supplemented with an epoxy potting material to provide a molded-in configuration. The successful application of a spacer into a sandwich structure panel will consider the overall thickness of the panel, face skin thickness, the type of core, and the desirability of a flush mounting with the surface of the face skin.

While the present invention will be described principally with regard to a spacer, for example, that can be used on a floor panel of an integral configuration, it should be appreciated that alternative two-part spacers, which include a plug and sleeve assembly that can be bonded together, or screwed together, can also be advantageously used, particularly by the provision of a sealant material to such spacers. Another type of spacer could be of a grommet type through-rivet spacer configuration, which may advantageously use the teaching of the sealing compound of the present invention.

Figure 3:
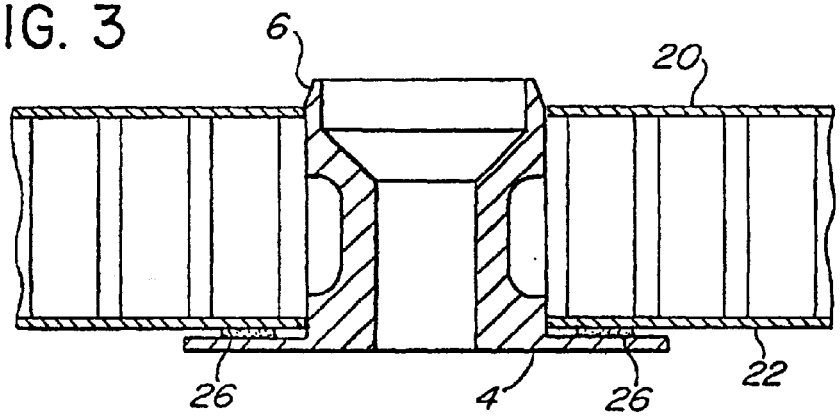
FIG. 3 is a schematic view of a partial cross-sectional spacer of the first embodiment of the invention mounted within a sandwich panel.

Referring to FIG. 3, a spacer 2 can have its flange 4 coated with an adhesive 26 to enable the flange 4 to be adhered to the bottom surface or face plate 22 of the panel 16. The relative thickness of the panel to that of the height of the spacer 2 positions the entrance rim portion 6 above the surface of the upper face plate 20 by a predetermined distance, for example, for a 0.390 inch thick panel the entrance rim extends above the face skin of the panel by 0.050 inches.

Figure 4:
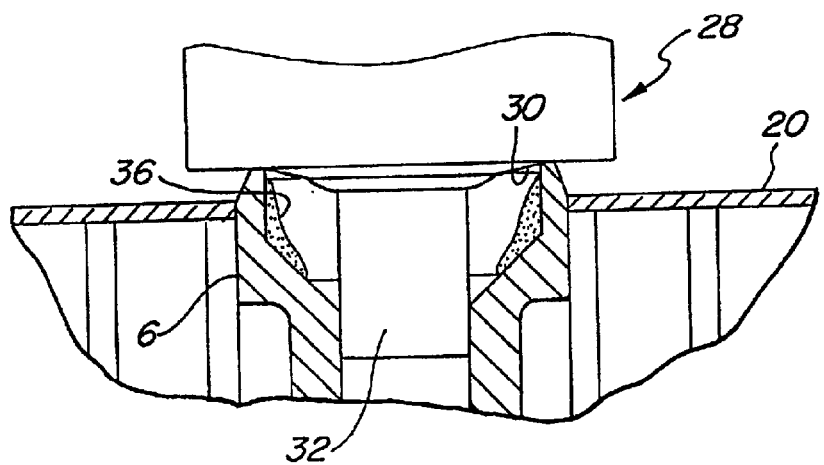
FIG. 4 is a partial cross-sectional view disclosing the application of a mounting force on the rim of a spacer mounted in the sandwich panel.
Figure 5:
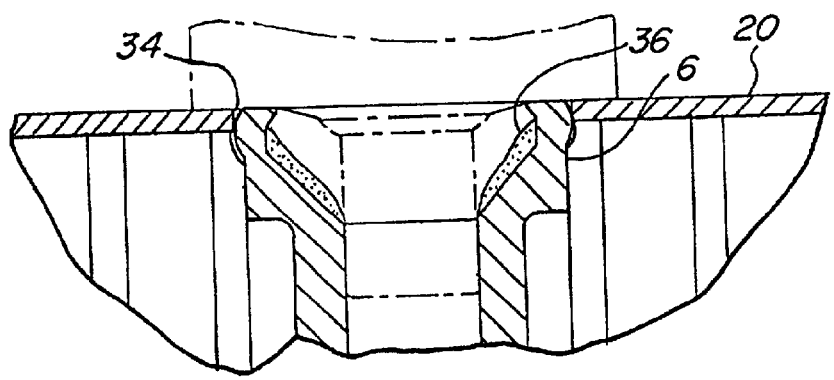
FIG. 5 is a cross-sectional view disclosing a spacer flush-mounted in a sandwich panel.

Referring to FIG. 4, a first embodiment of a setting tool 28 includes a specially designed contact bi-curved surface 30 for applying force to the upper edge of the rim 6. An alignment guide 32 is dimensioned to fit within the central aperture 10 to ensure the proper alignment of the setting tool 28. In this embodiment, the curved surface extends from the guide 32 with an initial convex surface of 0.176 inches in radius and transforms to a concave surface of 0.328 inches in radius. While not shown, an anvil or supporting tool can be placed opposite the setting tool 28 against the lower resin plate 22. By the proper application of a force with the setting tool 28, the bi-curved contact face surface 30 can force the rim 6 into the body of the panel 16 until it is flush with the surface of the upper face plate 20. The alignment guide 32 is journaled within the central aperture 10 during this procedure. As can be seen in FIG. 5, the outer diameter of the rim 6 will also bulge outward in a convex manner beneath the upper face plate 20, as a result of the force transmitted by the curved surface of the face surface 30. This bulging displacement or convex ring will help lock the upper portion of the spacer 2 in the panel 16.

It is highly desirable to seal the spacer 2 to the upper face plate 20, and in this regard, a sealant material, such as a silicone resin from Dow Corning such as a 1-2577 conformed coating, or other sealing compound can be used. In the preferred embodiment, a thermoplastic resin such as a UV Aero-Seal with safety film 616 that is sold by ND Industries of Santa Fe Springs, Calif., as ND VIBRA-TITE® has been successfully used. This outer sealant material 34 can be seen in FIG. 5 and can have a minimum thickness of 0.002 inches annularly about an exterior circumference of the cylindrical entrance rim. It is possible to have an excess of deposited sealing material and still effectuate a seal, but it is preferable to minimize any post installation clean-up procedure.

Additionally, another thermoplastic resin sealant material 36 can be provided within the spacer 2 to facilitate a further sealing with any fastener, such as a screw with a tapered head that is to be subsequentially journaled within the central aperture 10. This sealant material 36 can be an Aero-Seal SB11, again sold by ND Industries. The provision of this outside sealant 34 combined with the deformation of the rim 6 facilitates a liquid tight sealing of the spacer 2 about the perimeter of the bored hole within the upper face plate 20 of the panel 16. Tests have been conducted with water pressure set at 30 psi, and a water-tight seal was maintained by both the spacer and the method of the present invention.

FIG. 5 discloses the spacer 2 of the first embodiment with an initial position of the outside sealant 34 and the inside sealant 36 prior to an insulation of the spacer 2 within a bore or hole in a panel 16.

Figure 7:
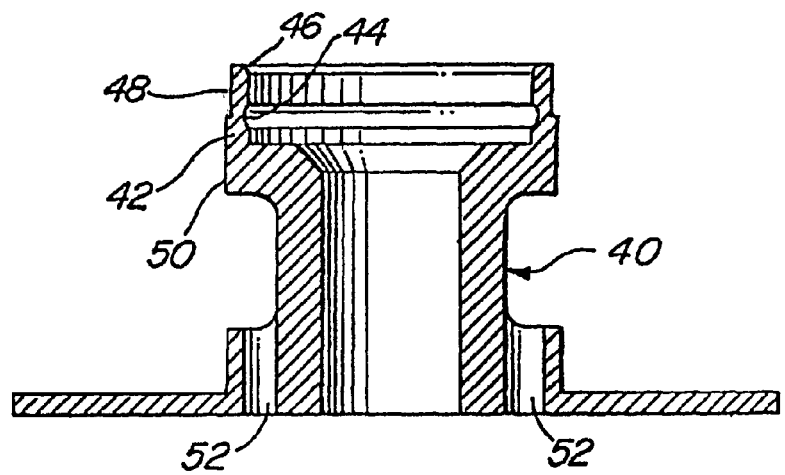
FIG. 7 is an elevated view of the spacer with sealing compound of the present invention.

An alternative embodiment of the present invention is disclosed in a spacer 40, as shown in FIGS. 7 and 11. In this embodiment, an entrance rim 42 is configured to provide a curved annular groove 44 having a vertical radius of about 0.022 inches extending about the inner wall of the entrance rim to facilitate a biasing of an outward convex bulging of the rim 42 when it is subject to an application of a force from the setting tool 28. The inner upper edge 46 of the rim 42 is beveled to complement the curved contact face surface 30 of the setting tool 28 so that a smooth application of force will be generated as the upper edge of the rim 42 is driven down to be flush with the surface of an upper face plate 20, while the outer surface of the rim 42 is cold-worked to form a convex ring beneath the upper face plate 20. The rim 42 can have an outer diameter 48 of a reduced size, as compared to the outer diameter of the spacer body 50, for example by approximately 0.007 inches. This reduction in diameter for approximately 0.070 inches in length on an outer surface of the rim 42 provides a slight ledge and can facilitate the reception of an outer sealant 34 so that it is not removed nor scraped off when the spacer 40 is inserted within an appropriate bore in a panel 16. This ensures that the outer sealant 34 is available to assist in providing a water-tight seal between the deformed or cold-worked rim 42 and the edge of the upper face plate perimeter about the bore hole. Again, an inner sealant material can be positioned within the inner diameter of the rim 42.

The body 50 can be provided, on its lower surface, with a pair of potting holes 52 to permit the installation of epoxy potting material to add additional strength to the mounted spacer. Each of the present embodiments can include the provision of such potting holes.

Figure 8:
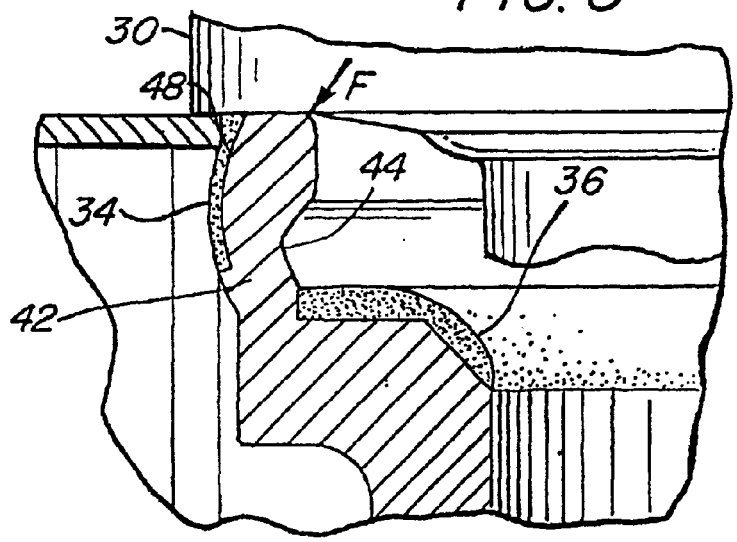
FIG. 8 is a partial cross-sectional view of an alternative embodiment of the spacer of the present invention.

As seen in FIG. 8, the curved surface 30 of the setting tool 28 contacts the beveled inner edge 46, and in cooperation with the groove 44 bends the rim 42 downward and outward to provide an annular bulge beneath the hole in the panel. The sealant 34 is compressed between the edge of the panel hole and the outer surface of the rim 42 to provide a water-tight seal. Any excess sealant on the surface of the panel 16 can be wiped off.

Figure 9:
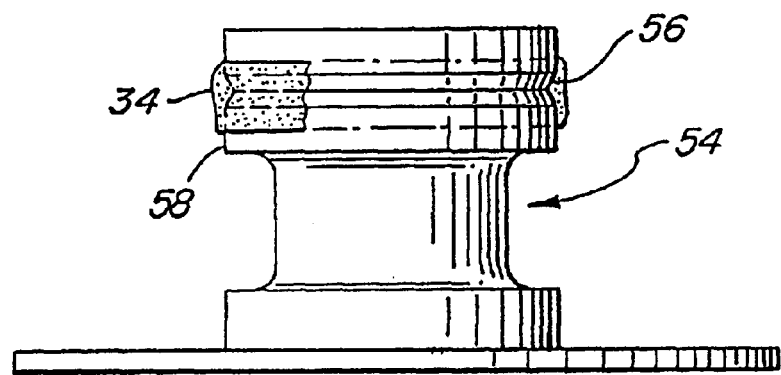
FIG. 9 is a partial cross-sectional view of another embodiment of the spacer of the present invention.

Another embodiment of the spacer of the present invention can be seen as spacer 54 in FIG. 9, and in this embodiment, a V-shaped groove 56 can be provided around the body portion 58 so that it can also carry and support the outer sealant 34.

Figure 6:
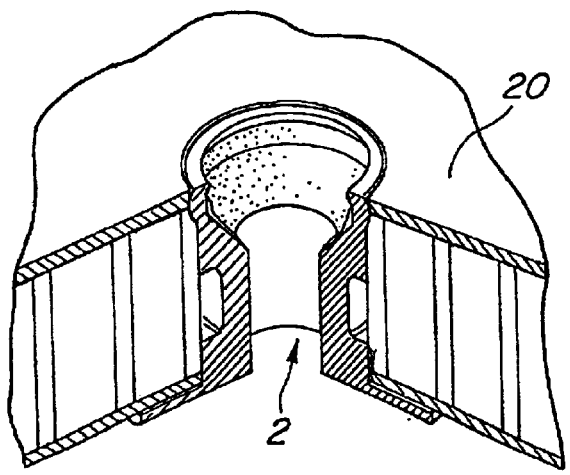
FIG. 6 is a perspective partial cross-sectional view disclosing a spacer mounted in a sandwich panel.

Referring to FIG. 6, a partial cross-sectional perspective view of the combination spacer and composite panel of the present invention is disclosed, wherein fasteners can be readily attached, while maintaining a water-tight seal, for example, on a floor panel of an airplane. As can be seen in FIG. 10, the improved panel 20 with a series of spacers 40 permits fasteners, such as screws 60, to extend through the panel 20 and to be anchored to a bulkhead such as a C-shaped beam 62. A lock nut 64 can secure the fastener 60 so that the heads of the fasteners are flush with a horizontal upper surface of the panel 20. The sealants insure a water tight seal on both the perimeter of the spacer 40 and to the head of the fastener 60.

The panel 20 can be automatically drilled with the spacers 40 installed in the panel 20 and then forced into a lock position automatically by application of the contact face of the setting tool 28. The first sealant is spread about the perimeter when the contact face of the setting tool 28 drives the rim of the spacer 40 downward to be flush with the panel surface. The spacer 40 is further deformed to provide a convex bulge to secure the spacer 40 to the panel. The plurality of fasteners help distribute the load on the panel to the beam 62. The second sealant within, the spacer helps seal the head of the fastener whereby a watertight seal is provided to the floor panel.

Finally, while not shown, the setting tool 28 can have a replaceable contact surface to permit repairs and rebuilding of the tool.

Figure 12:
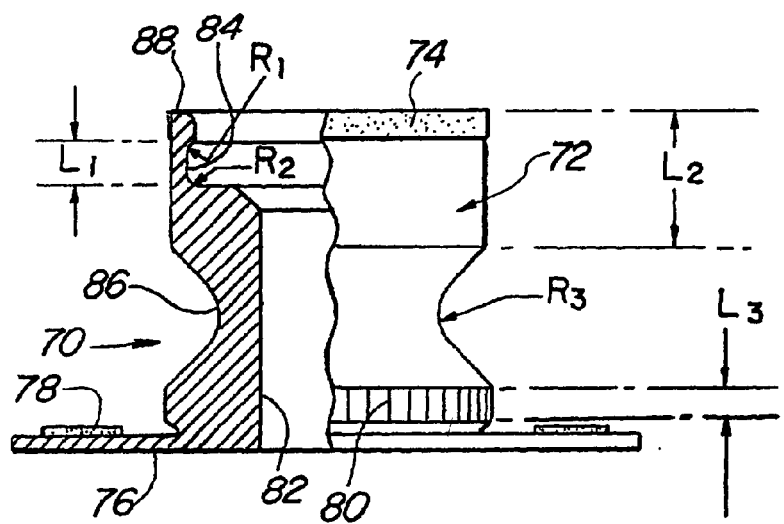
FIG. 12 is a partial cross-sectional view of still another embodiment of the spacer of the present invention.

FIG. 12 discloses an alternative embodiment of the spacer of the present invention which also, like the other embodiments, can be a unitary metallic spacer that is machined from an appropriate bar stock. The spacer 70 has an upper outer cylindrical surface 72 that supports a thin coat of the sealant material 74. The base of the spacer 70 includes the enlarged flange 76 with an annular coating of an adhesive 78 to permit the attachment to a panel face. A lower serrated cylindrical surface 80 is positioned immediately above the flange 76 and is slightly larger in diameter than the upper cylindrical outer surface 72. Surface 80 provides a hole engaging surface for a friction fit with the lower panel face and other surface engaging configurations can be used. The splines or serrations can number approximately 26 equally spaced teeth with the tooth pattern running horizontal about the bore 82 of the spacer 70. Each tooth can have a horizontal angle of approximately 45°. The major and minor diameters of the splines are selected to provide an adequate engagement with the hole in the lower panel face skin. An intermediate body portion of the spacer 70 can have an annular concave groove 86 of a dimension to ensure sufficient integrity and strength to the spacer 70 while maintaining the dimensions of the internal bore 82. The groove 86 enables a weight reduction to the spacer 70 and if auxiliary potting material is used, it helps to further secure the spacer 70 within a sandwich panel by anchoring the spacer within the potting compound. At the top of the serrations or splines 80, a vertically slanted lead angle, e.g., 30° or 45° is formed to act as a guide or lead in to the splines 80 to initially engage the hole in the panel during insertion of the spacer 70. This lead angle assists in permitting the serrations 80 to friction engage the hole, bored for example in a fiberglass panel sheet and to reduce any delamination effect.

The provision of the serrations 80 having a slightly larger diameter than the upper cylindrical surface 72 assists in minimizing problems that can occur in the automatic installation of spacers in honeycomb composite panels in a production environment. In such an environment, large honeycomb composite panels can incorporate multiple spacers and can be subject to rough handling before and during an accelerated cure of the adhesive on the flanges. Additionally, the drilling of holes in the honeycomb composite panels may be slightly off-centered in larger and out of round installation holes. The serrations 80 assist in centering the spacer insert to improve the sealability.

Finally, during the cure cycle of the adhesive, outgasing can occur by the solvents in the adhesive 78 and create a gas pressure that can tend to dislocate the spacer 70 from its installation. The serrations 80, by adding a frictional engagement, help counter this possible displacement of spacers.

As illustrative of possible dimensions for the spacer 70 in FIG. 12 and not as a limitation, the initial height of the spacer before the deformation of the entrance rim 88 can be approximately 0.460 inches, the diameter of the flange 76 can be 0.875 inches, the intermediate outer body concave groove 86 can include slanted surfaces of 45° with a center radius $R_3$ of 0.057 inches. The axial length $L_1$ of the inner groove 84 is approximately 0.065 inches, having an upper radius $R_1$ of approximately 0.020 inches and a lower radius $R_2$ of approximately 0.027 inches. The entrance rim has a slight inner bevel and the thickness of the rim wall between the outer cylindrical surface 72 and the inner annular groove 84 is approximately 0.030 inches. The dimension of the axial length $L_3$ of the serrated portion 80 is approximately 0.080 inches. Finally, the dimension $L_2$ of the outer cylindrical surface 72 is approximately 0.190 inches. These dimensions should not be construed as limitations to the scope of the present invention, but rather are set forth as possible operative dimensions for an aluminum alloy material of 6061-T6.

The thickness of the sealant 74 can be approximately 0.002 inches. While not shown, a sealant can also be provided on the beveled surface between the groove 84 and the bore 82.

Figure 13:
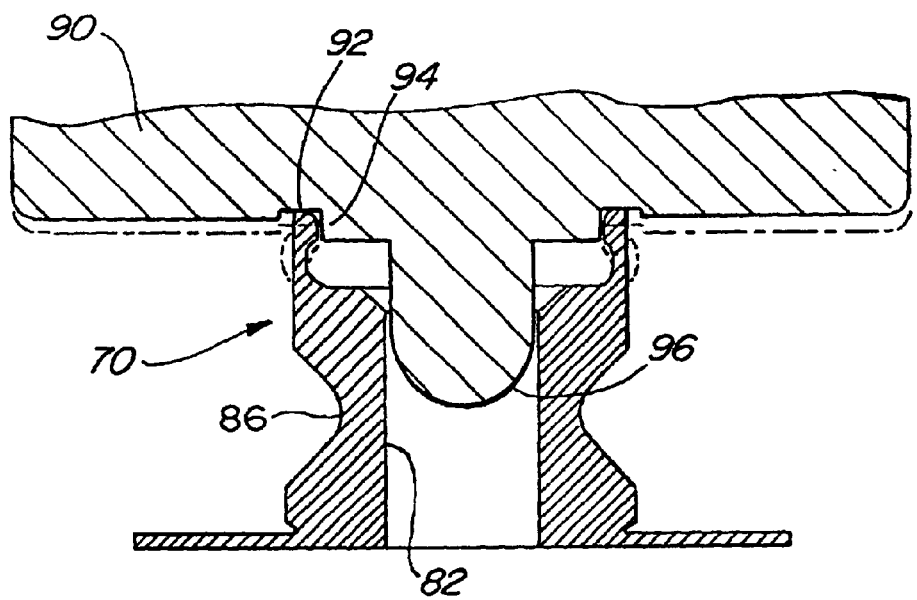
FIG. 13 is a partial cross-sectional view disclosing an alternative application of a mounting force on the rim of a spacer positioned within a sandwich panel.

Referring to FIG. 13, the tool 90 includes an annular flat indented recess 92 for applying a downward force on the flat annular rim 88 of the spacer 70. A support post 94 assists in alignment of the tool 90 along with the post 96 which is dimensioned to enter the bore 82.

Figure 14:
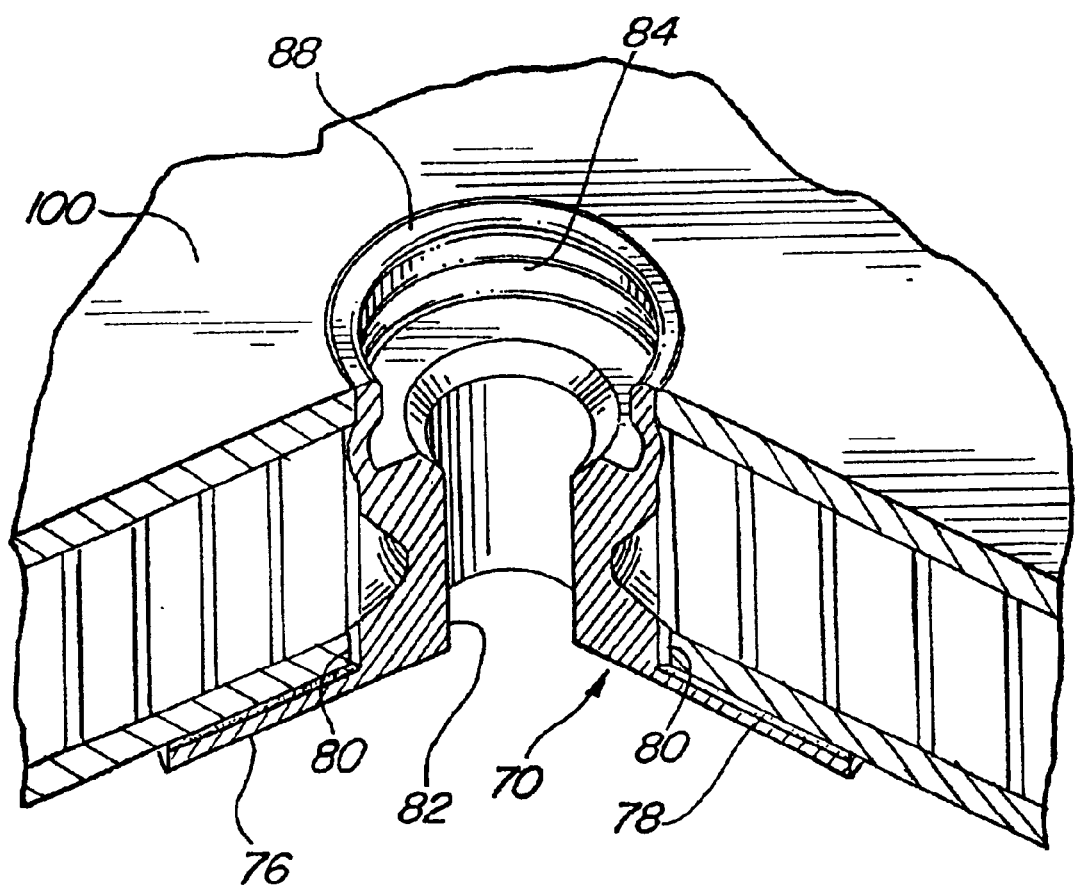
FIG. 14 is a perspective partial cross-sectional view disclosing the spacer of FIG. 12 mounted in a sandwich panel.

Referring to FIG. 14, a perspective view of the spacer 70 mounted within a sandwich panel 100 is disclosed.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of installing a spacer in a panel for mounting a fastener, comprising the steps of:
   making a hole in the panel;
   inserting a metal spacer having a height greater than a thickness of the panel in the hole, the spacer has an aperture, and an entrance rim extending about the aperture and above an upper surface of the panel; and
   exerting a force on the entrance rim to force the entrance rim into the hole to position an upper edge of the entrance rim flush with the upper surface of the panel adjacent a perimeter of the hole while forcing radially outward a portion of the spacer within the panel.

2. The method of claim 1, wherein the entrance rim is cylindrical and the force is applied by a setting tool to deform the entrance rim flush with the upper surface of the panel.

3. The method of claim 1 further including providing an internal sealing coating positioned annularly below the entrance rim.

4. The method of claim 1 further including a sealing coating on an exterior surface of the spacer to seal the perimeter of the hole with the entrance rim.

5. The method of claim 1, wherein the spacer has a flange on a side opposite from the entrance rim, the method further includes the step of adhering the flange to a bottom surface of the panel.

6. A method of installing a spacer in a panel, comprising the steps of:
   inserting a spacer into a hole in the panel, the hole being larger than an upper diameter of the spacer, the spacer having a height greater than a thickness of the panel so that an entrance rim of the spacer extends above an upper surface of the panel, and the spacer has a lower hole engaging surface to engage a perimeter of the hole for alignment of the spacer in the hole; and
   exerting a force on the entrance rim to force the entrance rim downward into the hole until an upper surface of the entrance rim is flush with the upper surface of the panel adjacent the hole and a portion of the entrance rim is forced, beneath the upper surface of the panel, beyond a perimeter of the hole.

7. The method of claim 6 further comprising the step of inserting a sealing compound into the hole by providing it about an outer surface of the spacer and sealingly deforming the sealing compound while exerting the force on the entrance rim.

8. An improved spacer for mounting within a panel of a predetermined thickness with a hole, comprising:
   a metal body member having a central aperture;
   a lower flange member extending radially outward from the body member;
   a serrated outer surface of the metal body member adjacent the lower flange member;

an upper rim member extending upward from the body member and concentric with the central aperture, the rim member having a larger inner diameter than a diameter of the central aperture with an inner flange extending from the rim member to the central aperture, a height of the spacer relative to the panel predetermined thickness is such to position an upper edge of the upper rim member above an upper panel surface when the lower flange member is in contact with a lower panel surface adjacent the hole; and a first sealing compound positioned adjacent the upper rim member on an outer surface of the spacer so that it is positioned adjacent an upper panel surface when the lower flange member is in contact with a lower panel surface whereby the first sealing compound can seal between the hole and the spacer when the spacer is mounted in the panel.

9. A spacer for mounting within a hole in a panel, comprising:

a metal body member with a rim member extending upward from the body member;

a hole engaging surface on the body member;

a lower flange extending outward from the body member, the hole engaging surface initially aligns the spacer within the hole and the rim member has an inner wall surface with an annular groove positioned to enable an upper edge of the rim member to be forced downward while a portion of the rim member extends outward whereby the upper edge of the rim member can be mounted flush in a hole in a panel while the rim member extends radially outward beneath a surface of the panel; and potting holes extending through a lower surface of the spacer.

10. The spacer of claim 9 wherein an outer wall surface of the rim member is coated with a sealing compound.

11. The spacer of claim 10 wherein the sealing compound is selected from one of a silicone resin and a thermoplastic resin.

12. The spacer of claim 9 wherein a second sealing compound is positioned within the rim member.

13. The spacer of claim 9 wherein a lower flange is connected to the body member on an opposite side from the rim member.

14. The spacer of claim 13 wherein a central aperture extends through the body member and the flange member.

15. A combination floor panel and spacer, comprising:

a sandwich panel having an upper planar face plate and a lower planar face plate separated by a core structure, a hole extending through the sandwich panel;

a spacer having a body member and a rim member extending upward from the body member, wherein the rim member has an annular groove to assist in permitting the rim member to be deformed outward when flush mounted within the sandwich panel;

a hole engaging surface on the body member aligns the spacer within the hole; and an upper edge of the rim member is positioned adjacent a perimeter of the hole and is flush with a surface of the upper planar face plate, a portion of the rim member is extended radially outward from the flush upper edge of the rim member below the upper planar face plate.

16. The combination floor panel and spacer of claim 15 further including a first sealing compound providing a water tight seal between the perimeter of the hole and the upper edge of the rim member.

17. The combination floor panel and spacer of claim 16 wherein the first sealing compound is selected from one of a silicone resin and a thermoplastic resin.

18. The combination floor panel and spacer of claim 15 wherein a second sealing compound is positioned within the rim member to enable a sealing contact with a fastener.

19. The combination floor panel and spacer of claim 15 wherein the hole engaging surface on the body member is an annular serrated surface.

20. The method of claim 2 wherein the metal spacer has an inner groove in the entrance rim and the entrance rim is radially thicker above the inner groove than the radial thickness of the inner groove and the step of exerting a force translates the thinner inner groove outward within the panel.

21. The method of claim 20 wherein the metal spacer has a lower serrated cylindrical outer surface and the step of inserting a metal spacer includes forcing the serrated cylindrical surface into a bottom surface of the panel.

22. The method of claim 5 wherein the metal spacer has a serrated cylindrical surface positioned above the flange and the step of inserting a metal spacer includes forcing the serrated cylindrical surface into a bottom surface of the panel.

23. The method of claim 6 wherein the lower hole engaging surface is a serrated cylindrical surface and the step of inserting a spacer includes having the serrated cylindrical surface engage a bottom surface of the panel and to align the spacer in the hole.

24. The method of claim 6 wherein the spacer has an inner groove in the entrance rim and the entrance rim is radially thicker above the inner groove than the radial thickness of the inner groove and the step of exerting a force translates the thinner inner groove outward beneath the panel upper surface.

25. The improved spacer of claim 8 wherein the upper rim member has an annular groove positioned to enable a radially thicker rim surface to be pushed downward while the thinner annular groove is pushed outward for locking the spacer within the panel.

26. A spacer for mounting within a hole in a panel, comprising:

an integral hollow metal body member having an annular rim member of a predetermined circumference extending upward from the body member;

a hole engaging outer surface on the body member; and an integral lower flange extending outward from the body member, the hole engaging surface initially aligns the spacer within the hole and the rim member has an inner wall surface with an annular groove providing a predetermined deformable thickness to the rim member, the annular groove is operatively positioned adjacent to an upper edge of the rim member to enable the rim member to be forced downward and to deform a portion of the rim member to extend outward beyond the predetermined circumference whereby the upper edge of the rim member can be mounted flush in a hole in a panel while the deformed portion of the rim member extends radially outward beneath a surface of the panel.

27. The spacer of claim 26 wherein a portion of an outer wall surface of the rim member is coated with a sealing compound.

28. The spacer of claim 26 wherein a central aperture extends through the body member and the flange member.

29. The spacer of claim 26 including potting holes extending through a lower surface of the spacer.

* * * * *